(12) United States Patent
Love

(10) Patent No.: US 8,636,863 B2
(45) Date of Patent: Jan. 28, 2014

(54) WIDE SHEET MAGNETIC SYSTEMS

(75) Inventor: Thomas G. Love, Marietta, OH (US)

(73) Assignee: Magnum Magnetics Corporation, Marietta, OH (US)

( * ) Notice: Subject to any disclaimer, the term of this patent is extended or adjusted under 35 U.S.C. 154(b) by 276 days.

(21) Appl. No.: 12/948,654

(22) Filed: Nov. 17, 2010

(65) Prior Publication Data

US 2011/0120638 A1    May 26, 2011

Related U.S. Application Data

(60) Provisional application No. 61/281,634, filed on Nov. 20, 2009.

(51) Int. Cl.
*B29C 65/04* (2006.01)

(52) U.S. Cl.
USPC ........................... 156/73.4; 156/516; 156/544

(58) Field of Classification Search
USPC ............... 156/428, 516, 544, 549, 543, 73.4, 156/73.5, 73.6, 502, 504
See application file for complete search history.

(56) References Cited

U.S. PATENT DOCUMENTS

| | | | | |
|---|---|---|---|---|
| 5,023,427 A | * | 6/1991 | Neiheisel et al. | 219/121.82 |
| 6,615,892 B2 | * | 9/2003 | Hubbard et al. | 156/428 |
| 2009/0250134 A1 | * | 10/2009 | Slagsvold et al. | 138/137 |
| 2009/0266468 A1 | * | 10/2009 | Pilpel | 156/60 |

FOREIGN PATENT DOCUMENTS

| | | |
|---|---|---|
| JP | 2002137320 A | 5/2002 |
| JP | 2003071978 A | 3/2003 |

* cited by examiner

*Primary Examiner* — Yogendra Gupta
*Assistant Examiner* — Vishal I Patel
(74) *Attorney, Agent, or Firm* — Stoneman Law Patent Group; Martin L. Stoneman

(57) ABSTRACT

A system and apparatus relating to connecting at least one first longitudinal periphery of at least one first magnetic sheet with at least one second longitudinal periphery of at least one second magnetic sheet by placing such first longitudinal periphery in adjacent relationship with such second longitudinal periphery; and connecting such first longitudinal periphery in adjacent relationship with such second longitudinal periphery; wherein such connecting step comprises the step of unitizing such at least one first magnetic sheet and such at least one second magnetic sheet into one unitary magnetic sheet.

18 Claims, 3 Drawing Sheets

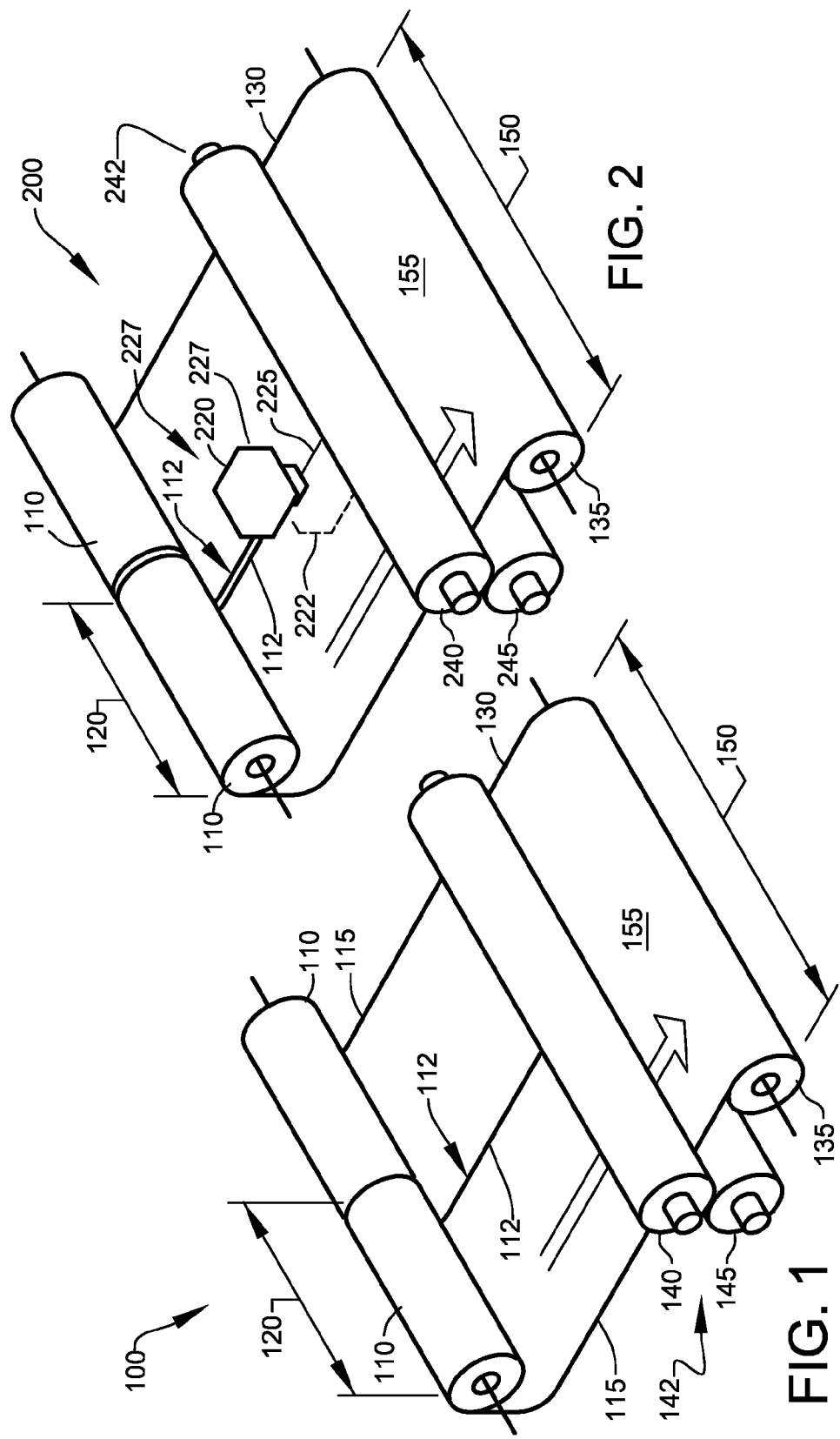

WIDE SHEET MAGNETIC SYSTEMS

CROSS-REFERENCE TO RELATED APPLICATION

The present application is related to and claims priority from prior provisional application Ser. No. 61/281,634 filed Nov. 20, 2009, entitled "WIDE SHEET MAGNETIC SYSTEMS", the contents of which are incorporated herein by this reference and are not admitted to be prior art with respect to the present invention by the mention in this cross-reference section.

BACKGROUND

This invention relates to providing a system for wide sheet magnetic systems. More particularly, this invention relates to providing a system for making wide magnetic sheets. In manufacturing flexible magnetic sheets, width of a continuous roll of magnetic sheeting may be limited by available machinery. Particularly when making large magnetic signs a single roll of magnetic sheeting is desirable for ease of installation and quality of sign printing. A sign having multiple strips must be aligned when installed and must have precise border to border printing to eliminate lines and mismatching of images across a border. Therefore, a need exists to make wider magnetic sheeting rolls.

OBJECTS AND FEATURES OF THE INVENTION

A primary object and feature of the present invention is to provide a wide magnetic sheet system overcoming the above-mentioned problem(s).

It is a further object and feature of the present invention to provide such a system which joins multiple widths of magnetic sheeting into a wide magnetic sheet.

Another object and feature of the present invention is to provide such a system which uses adhesives to join multiple widths of magnetic sheeting.

It is yet another object and feature of the present invention to provide such a system which uses heat to join multiple widths of magnetic sheeting.

A further object and feature of the present invention is to provide such a system which mechanically joins multiple widths of magnetic sheeting.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a method, relating to connecting at least one first longitudinal periphery of at least one first magnetic sheet with at least one second longitudinal periphery of at least one second magnetic sheet, comprising the steps of: placing such first longitudinal periphery in adjacent relationship with such second longitudinal periphery; and connecting such first longitudinal periphery in adjacent relationship with such second longitudinal periphery; wherein such connecting step comprises the step of unitizing such at least one first magnetic sheet and such at least one second magnetic sheet into one unitary magnetic sheet.

Moreover, it provides such a method further comprising the step of smoothing at least one surface of such at least one unitary magnetic sheet along at least one line defined by at least one such longitudinal periphery. Additionally, it provides such a method wherein such smoothing step comprises smoothing sufficiently to permit printing of indicia across such at least one line with sheet printers. Also, it provides such a method wherein such smoothing step further comprises the step of applying heat to such at least one line. In addition, it provides such a method such connecting step further comprises the step of applying heat to such first longitudinal periphery and such second longitudinal periphery. And, it provides such a method wherein the step of applying heat comprises the step of infrared-heating with at least one infrared heater. Further, it provides such a method wherein the step of applying heat comprises the step of contact-heating with at least one contact heater. Even further, it provides such a method wherein the step of applying heat comprises the step of laser-heating with at least one laser heater. Moreover, it provides such a method wherein the step of applying heat comprises the step of microwave-heating with at least one microwave heater.

In accordance with another preferred embodiment hereof, this invention provides a system, relating to connecting at least one first longitudinal periphery of at least one first magnetic sheet with at least one second longitudinal periphery of at least one second magnetic sheet, comprising: at least one placer structured and arranged to place such first longitudinal periphery in adjacent relationship with such second longitudinal periphery; and at least one connector structured and arranged to connect such first longitudinal periphery in adjacent relationship with such second longitudinal periphery; wherein such at least one connector comprises at least one unitizer structured and arranged to unitize such at least one first magnetic sheet and such at least one second magnetic sheet into one unitary magnetic sheet. Additionally, it provides such a system further comprising at least one smoother structured and arranged to smooth at least one surface of such at least one unitary magnetic sheet along at least one line defined by at least one such longitudinal periphery. Also, it provides such a system wherein such smoothing is sufficient to permit printing of indicia across such at least one line with sheet printers.

In addition, it provides such a system wherein such at least one smoother comprises at least one heat applicator structured and arranged to apply heat to such at least one line. And, it provides such a system wherein such at least one connector further comprises at least one heat applicator structured and arranged to apply heat to such first longitudinal periphery and such second longitudinal periphery. Further, it provides such a system wherein such at least one heat applicator comprises at least one infrared heater. Even further, it provides such a system wherein such at least one heat applicator comprises at least one contact heater. Even further, it provides such a system wherein such at least one heat applicator comprises at least one laser heater. Even further, it provides such a system wherein such at least one heat applicator comprises at least one microwave heater.

In accordance with another preferred embodiment hereof, this invention provides a system, relating to connecting at least one first longitudinal periphery of at least one first magnetic sheet with at least one second longitudinal periphery of at least one second magnetic sheet, comprising: placer means for placing such first longitudinal periphery in adjacent relationship with such second longitudinal periphery; and connector means for connecting such first longitudinal periphery in adjacent relationship with such second longitudinal periphery; wherein such connector means comprises unitizer means for unitizing such at least one first magnetic sheet and such at least one second magnetic sheet into one unitary magnetic sheet. Even further, it provides such a system further comprising smoother means for smoothing at least one surface of such at least one unitary magnetic sheet along at least one line defined by at least one such longitudinal periphery. Even further, it provides such a system wherein such smoothing is sufficient to permit printing of indicia across such at least one line with sheet printers.

In accordance with another preferred embodiment hereof, this invention provides for each and every novel feature, element, combination, step and/or method disclosed or suggested by this patent application.

BRIEF DESCRIPTION OF THE DRAWINGS

FIG. 1 shows a perspective view, illustrating a single-stage magnetic-sheeting joining process, according to a preferred embodiment of the present invention.

FIG. 2 shows a perspective view, illustrating a multi-stage magnetic-sheeting joining process, according to the preferred embodiment of FIG. 1.

Figure 3:
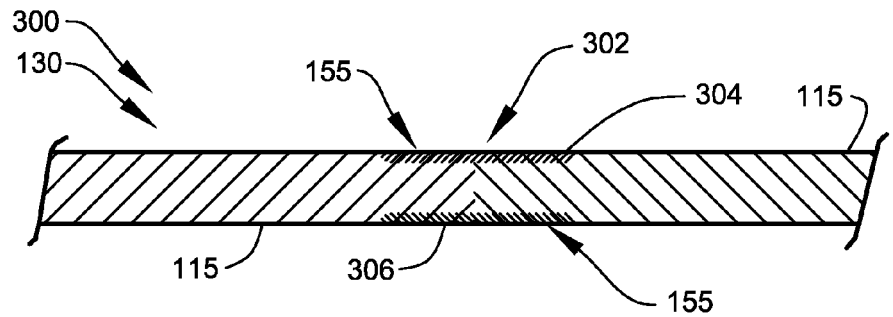
FIG. 3 shows a cross-sectional view of a wide-width magnetic sheet, illustrating a preferred joint in unitary wide-width magnetic sheeting, according to the preferred embodiment of the present invention.

DETAILED DESCRIPTION OF THE BEST MODES AND PREFERRED EMBODIMENTS OF THE INVENTION

Applicant has observed that in manufacturing magnetic sheeting 115, rolls 110 of magnetic sheeting 115 are limited in width 120, as shown in FIG. 1 and FIG. 2, by equipment limitations. To obtain a larger width 150, multiple rolls 110 preferably are joined to make at least one wider roll 135 of unitary wide-width magnetic sheeting 130, as shown in FIG. 1 and FIG. 2. Magnetic sheeting 115 and unitary wide-width magnetic sheeting 130 preferably comprise at least one magnetizable material, preferably at least one flexible magnetizable material.

FIG. 1 shows a perspective view, illustrating a single-stage magnetic-sheeting joining process 100, according to a preferred embodiment of the present invention.

Single-stage magnetic-sheeting joining process 100 preferably joins at least two rolls 110, as shown. Magnetic sheeting 115 preferably comprises at least one edge 112, as shown. In single-stage magnetic-sheeting joining process 100, each roll 110 of magnetic sheeting 115 preferably is aligned to place one of edge 112 of each roll 110 adjacent, as shown (this arrangement at least embodying herein placing such first longitudinal periphery in adjacent relationship with such second longitudinal periphery; and this arrangement at least embodying herein at least one placer structured and arranged to place such first longitudinal periphery in adjacent relationship with such second longitudinal periphery). Edges 112 are preferably butted against each other, as shown. Upon reading the teachings of this specification, those skilled in the art will now appreciate that, under appropriate circumstances, considering such issues as cost, future technologies, etc., other positioning, such as, for example, overlapped, angled, etc., may suffice.

Magnetic sheeting 115 preferably feeds through at least one joiner 142, as shown. Joiner 142 preferably comprises at least one top joiner 140 and at least one bottom joiner 145, as shown. Magnetic sheeting 115 preferably feeds between top joiner 140 and bottom joiner 145, as shown. Top joiner 140 and bottom joiner 145 preferably each comprises at least one roller, as shown. Upon reading the teachings of this specification, those skilled in the art will now appreciate that, under appropriate circumstances, considering such issues as cost, future technologies, etc., other joiners, such as, for example, pressure plates, gravity presses, magnetic presses, etc., may suffice.

Joiner 142 (at least embodying herein at least one connector structured and arranged to connect such first longitudinal periphery in adjacent relationship with such second longitudinal periphery) preferably presses magnetic sheeting 115 together along edges 112, preferably joining magnetic sheeting 115 from such at least two rolls 110 into unitary wide-width magnetic sheeting 130, as shown (this arrangement at least embodying herein connecting such first longitudinal periphery in adjacent relationship with such second longitudinal periphery). Joiner 142 preferably cold-presses magnetic sheeting 115, alternately preferably joiner 142 applies heat to join magnetic sheeting 115. Upon reading the teachings of this specification, those skilled in the art will now appreciate that, under appropriate circumstances, considering such issues as cost, future technologies, etc., other joining activators, such as, for example, melting agents, vibrations, etc., may suffice.

Joiner 142 preferably leaves unitary wide-width magnetic sheeting 130 with a smooth surface 155, preferably where the joint between magnetic sheeting 115 is indistinguishable from the rest of smooth surface 155. Smooth surface 155 preferably comprises a surface free from undulations due to variations in thicknesses in unitary wide-width magnetic sheeting 130. Both sides of unitary wide-width magnetic sheeting 130 preferably comprise smooth surfaces 155. Smooth surface 155 preferably may be printed upon without loss of quality from variations in smooth surface 155 (at least embodying herein wherein such smoothing step comprises smoothing sufficiently to permit printing of indicia across such at least one line with sheet printers).

FIG. 2 shows a perspective view, illustrating a multi-stage magnetic-sheeting joining process 200, according to the preferred embodiment of FIG. 1. Multi-stage magnetic-sheeting joining process 200, similar to single-stage magnetic-sheeting joining process 100, preferably joins such at least two rolls 110 to make wider roll 135 of unitary wide-width magnetic sheeting 130, preferably comprising larger width 150, as shown. However, multi-stage magnetic-sheeting joining process 200 preferably comprises at least one joiner 227 and preferably at least one smoother 242, as shown. Upon reading the teachings of this specification, those skilled in the art will now appreciate that, under appropriate circumstances, considering such issues as cost, future technologies, etc., other components of a joining process, such as, for example, aligners, trimmers, etc., may suffice.

Joiner 227 preferably comprises at least one top joiner 220 and preferably at least one bottom joiner 222, as shown. Edges 112 to be joined preferably pass between top joiner 220 and bottom joiner 222, as shown. Upon reading the teachings of this specification, those skilled in the art will now appreciate that, under appropriate circumstances, considering such issues as cost, future technologies, method of joining, etc., other joiner arrangements, such as, for example, interposed-blade single joiners, serial joiners, etc., may suffice.

Joiner 227 preferably comprises at least one material applicator. Joiner 227 preferably applies at least one adhesive, alternately preferably at least one strip of material complementary to magnetic sheeting 115, alternately preferably at least one adhesive strip. Upon reading the teachings of this specification, those skilled in the art will now appreciate that, under appropriate circumstances, considering such issues as cost, future technologies, etc., other materials, such as, for example, resins, dissolution compounds, combinations of materials, etc., may suffice.

Alternately, joiner 227 preferably comprises at least one heater. Joiner 227 preferably applies heat to edges 112 of magnetic sheeting 115, to join edges 112 (this arrangement at least embodying herein applying heat to such first longitudinal periphery and such second longitudinal periphery; and this arrangement at least herein embodying wherein such at least one connector further comprises at least one heat applicator structured and arranged to apply heat to such first longitudinal periphery and such second longitudinal periphery). Joiner 227 preferably comprises at least one contact heater (at least herein embodying wherein the step of applying heat comprises the step of contact-heating with at least one contact heater; and at least herein embodying wherein such at least one heat applicator comprises at least one contact heater), alternately preferably at least one infrared heater (at least herein embodying wherein the step of applying heat comprises the step of infrared-heating with at least one infrared heater; and at least herein embodying wherein such at least one heat applicator comprises at least one infrared heater), alternately preferably at least one laser heater (at least herein embodying wherein the step of applying heat comprises the step of laser-heating with at least one laser heater; and at least herein embodying wherein such at least one heat applicator comprises at least one laser heater), alternately preferably at least one microwave heater (at least herein embodying wherein the step of applying heat comprises the step of microwave-heating with at least one microwave heater; and at least herein embodying wherein such at least one heat applicator comprises at least one microwave heater). Upon reading the teachings of this specification, those skilled in the art will now appreciate that, under appropriate circumstances, considering such issues as cost, future technologies, materials, etc., other heating devices, such as, for example, other EM-wave heaters, chemical heaters, vibration heaters, etc., may suffice.

Smoother 242 preferably comprises at least one top smoother 240 and at least one bottom smoother 245, as shown. Top smoother 240 and bottom smoother 245 preferably comprise rollers, as shown. Upon reading the teachings of this specification, those skilled in the art will now appreciate that, under appropriate circumstances, considering such issues as future technologies, cost, etc., other smoothers, such as, for example, pressure plates, mills, shavers, etc., may suffice.

In multi-stage magnetic-sheeting joining process 200, joiner 227 preferably joins edges 112 into at least one seam 225, as shown. After seam 225 is created, smoother 242 (at least embodying herein at least one smoother structured and arranged to smooth at least one surface of such at least one unitary magnetic sheet along at least one line defined by at least one such longitudinal periphery) preferably smoothes out surface imperfections along seam 225, preferably leaving smooth surface 155 (this arrangement at least embodying herein smoothing at least one surface of such at least one unitary magnetic sheet along at least one line defined by at least one such longitudinal periphery) on unitary wide-width magnetic sheeting 130, as shown. Smoother 242 preferably cold-presses seam 225, alternately preferably smoother 242 applies heat to smooth seam 225 (at least herein embodying wherein such smoothing step further comprises the step of applying heat to such at least one line; and at least herein embodying wherein such at least one smoother comprises at least one heat applicator structured and arranged to apply heat to such at least one line). Upon reading the teachings of this specification, those skilled in the art will now appreciate that, under appropriate circumstances, considering such issues as cost, future technologies, etc., other smoothers, such as, for example, mills, lasers, pressure plates, etc., may suffice.

FIG. 3 shows a cross-sectional view of a wide-width magnetic sheet 300, illustrating a preferred joint 302 in unitary wide-width magnetic sheeting 130, according to a preferred embodiment of the present invention. In wide-width magnetic sheet 300, joint 302 preferably comprises at least one top adhesive tape 304 and at least one bottom adhesive tape 306, as shown. Top adhesive tape 304 and bottom adhesive tape 306 preferably each comprise at least one plastic strip, preferably with at least one adhesive on at least one side. In multi-stage magnetic-sheeting joining process 200, joiner 227 preferably applies top adhesive tape 304 and bottom adhesive tape 306, preferably with adhesive side toward magnetic sheeting 115, to edges 112. Upon reading the teachings of this specification, those skilled in the art will now appreciate that, under appropriate circumstances, considering such issues as cost, future technologies, etc., other tape applicators, such as, for example, rollers, feed plates, spray applicators, etc., may suffice.

After taping, joiner 227 (at least herein embodying wherein such at least one connector comprises at least one unitizer structured and arranged to unitize such at least one first magnetic sheet and such at least one second magnetic sheet into one unitary magnetic sheet) preferably fuses seam 225, preferably with heat (at least embodying herein wherein such connecting step comprises the step of unitizing such at least one first magnetic sheet and such at least one second magnetic sheet into one unitary magnetic sheet). Upon reading the teachings of this specification, those skilled in the art will now appreciate that, under appropriate circumstances, considering such issues as cost, future technologies, etc., other joint fusers, such as, for example, mechanical fusing, chemical fusing, etc., may suffice.

Smoother 242 preferably presses top adhesive tape 304 and bottom adhesive tape 306 into surface of magnetic sheeting 115, forming smooth surface 155, as shown. Alternately, smoother 242 preferably applies heat to fuse seam 225 while creating smooth surface 155, as shown. Upon reading the teachings of this specification, those skilled in the art will now appreciate that, under appropriate circumstances, considering such issues as cost, future technologies, etc., other surface smoothing techniques, such as, for example, heating and pressing, milling, etc., may suffice.

Multi-stage magnetic-sheeting joining process 200, preferably results in unitary wide-width magnetic sheeting 130, having a cross-section, as shown, comprising wide-width magnetic sheet 300.

Figure 4:
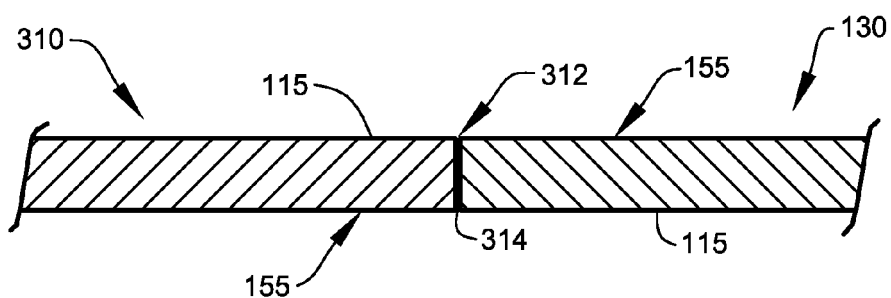
FIG. 4 shows a cross-sectional view of a wide-width magnetic sheet, illustrating another preferred joint in unitary wide-width magnetic sheeting, according to the preferred embodiment of the present invention.

FIG. 4 shows a cross-sectional view of a wide-width magnetic sheet 310, illustrating another preferred joint 312 in unitary wide-width magnetic sheeting 130, according to another preferred embodiment of the present invention.

In wide-width magnetic sheet 310, joint 312 preferably comprises at least one adhesive 314, as shown. Joiner 227 preferably applies adhesive 314 between edges 112. Adhesive 314 preferably bonds edges 112 together, preferably forming seam 225, as shown. Adhesive 314 preferably comprises plastic compound fusing agents, alternately preferably plastic compound adhering agents. Upon reading the teachings of this specification, those skilled in the art will now appreciate that, under appropriate circumstances, considering such issues as cost, future technologies, etc., other adhesives, such as, for example, compounds of plastics, compounds of materials similar to magnetic sheeting, etc., may suffice.

Smoother 242 preferably removes any excess adhesive 314. Smoother 242 may also preferably comprise at least one set-activator of adhesive 314, preferably heat. Upon reading the teachings of this specification, those skilled in the art will now appreciate that, under appropriate circumstances, considering such issues as cost, future technologies, etc., other set activators, such as, for example, pressure, fluids, chemicals, etc., may suffice.

Multi-stage magnetic-sheeting joining process 200, preferably results in unitary wide-width magnetic sheeting 130, having a cross-section, as shown, comprising wide-width magnetic sheet 310.

Figure 5:
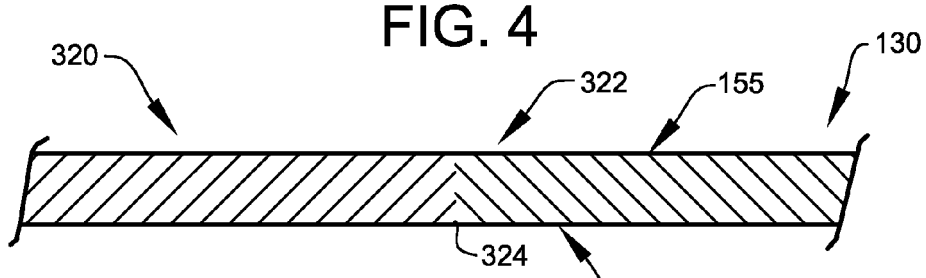
FIG. 5 shows a cross-sectional view of a wide-width magnetic sheet, illustrating yet another preferred joint in unitary wide-width magnetic sheeting, according to the preferred embodiment of the present invention.

FIG. 5 shows a cross-sectional view of a wide-width magnetic sheet 320, illustrating yet another preferred joint 322 in unitary wide-width magnetic sheeting 130, according to yet another preferred embodiment of the present invention.

In wide-width magnetic sheet 320, joint 322 preferably comprises at least one fused seam 324, as shown. Wide-width magnetic sheet 320, as shown, preferably results from multi-stage magnetic-sheeting joining process 200, alternately preferably from single-stage magnetic-sheeting joining process 100. In multi-stage magnetic-sheeting joining process 200 edges 112 are preferably fused by joiner 227, preferably by heating. Alternately in single-stage magnetic-sheeting joining process 100, edges 112 are preferably fused by joiner 142. Upon reading the teachings of this specification, those skilled in the art will now appreciate that, under appropriate circumstances, considering such issues as cost, future technologies, etc., other fusing methods, such as, for example, pressure fusing, chemical fusing, etc., may suffice.

Multi-stage magnetic-sheeting joining process 200 (or alternately single-stage magnetic-sheeting joining process 100), preferably results in unitary wide-width magnetic sheeting 130, having a cross-section, as shown, comprising wide-width magnetic sheet 320.

Figure 6:
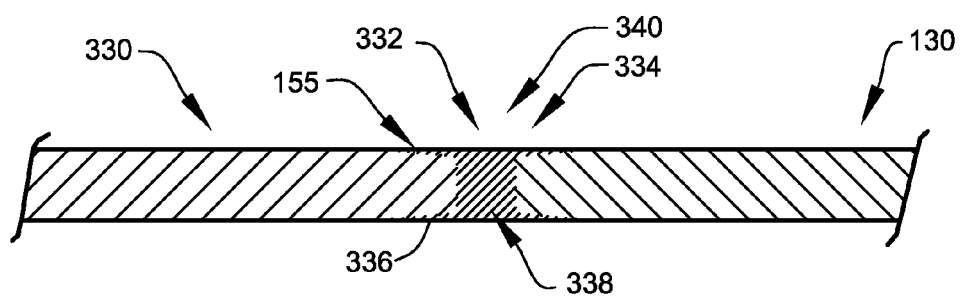
FIG. 6 shows a cross-sectional view of a wide-width magnetic sheet, illustrating yet another preferred joint in unitary wide-width magnetic sheeting, according to the preferred embodiment of the present invention.

FIG. 6 shows a cross-sectional view of a wide-width magnetic sheet 330, illustrating yet another preferred joint 332 in unitary wide-width magnetic sheeting 130, according to yet another preferred embodiment of the present invention.

In wide-width magnetic sheet 330, joint 332 preferably comprises at least one added material 340, as shown. Added material preferably comprises at least one plastic, preferably compatible for bonding with magnetic sheeting 115, to make unitary wide-width magnetic sheeting 130, as shown. Upon reading the teachings of this specification, those skilled in the art will now appreciate that, under appropriate circumstances, considering such issues as cost, future technologies, available materials, etc., other materials, such as, for example, set-resins, other plastics, magnetic-particle-laden materials, etc., may suffice.

Joiner 227 preferably applies added material 340 as solid strips of material on top surface 334 and bottom surface 336, preferably across edges 112, as shown. Edges 112 preferably have a small spacing 338 between edges 112, as shown. After applying such solid strips of added material, joiner 227 preferably heats added material to activate joining of edges 112 into seam 225. Added material 340 preferably fills in small spacing 338, as shown.

Alternately, joiner 227 preferably applies added material 340 in a flowing state. Added material 340 preferably flows into small spacing 338 between edges 112, preferably joining edges 112. Joiner preferably applies added material 340 in a heated flowing state to activate joining of edges 112 into seam 225.

Upon reading the teachings of this specification, those skilled in the art will now appreciate that, under appropriate circumstances, considering such issues as cost, future technologies, etc., other material adding methods, such as, for example, injection, pressure application, etc., may suffice.

Smoother 242 preferably presses added material 340 into top surface 334 and bottom surface 336, preferably forming smooth surface 155, as shown. Alternately, smoother 242 preferably applies heat to fuse seam 225 while creating smooth surface 155. Upon reading the teachings of this specification, those skilled in the art will now appreciate that, under appropriate circumstances, considering such issues as cost, future technologies, etc., other surface smoothing techniques, such as, for example, heating and pressing, milling, etc., may suffice.

Multi-stage magnetic-sheeting joining process 200, preferably results in unitary wide-width magnetic sheeting 130, having a cross-section, as shown, comprising wide-width magnetic sheet 330.

Figure 7:
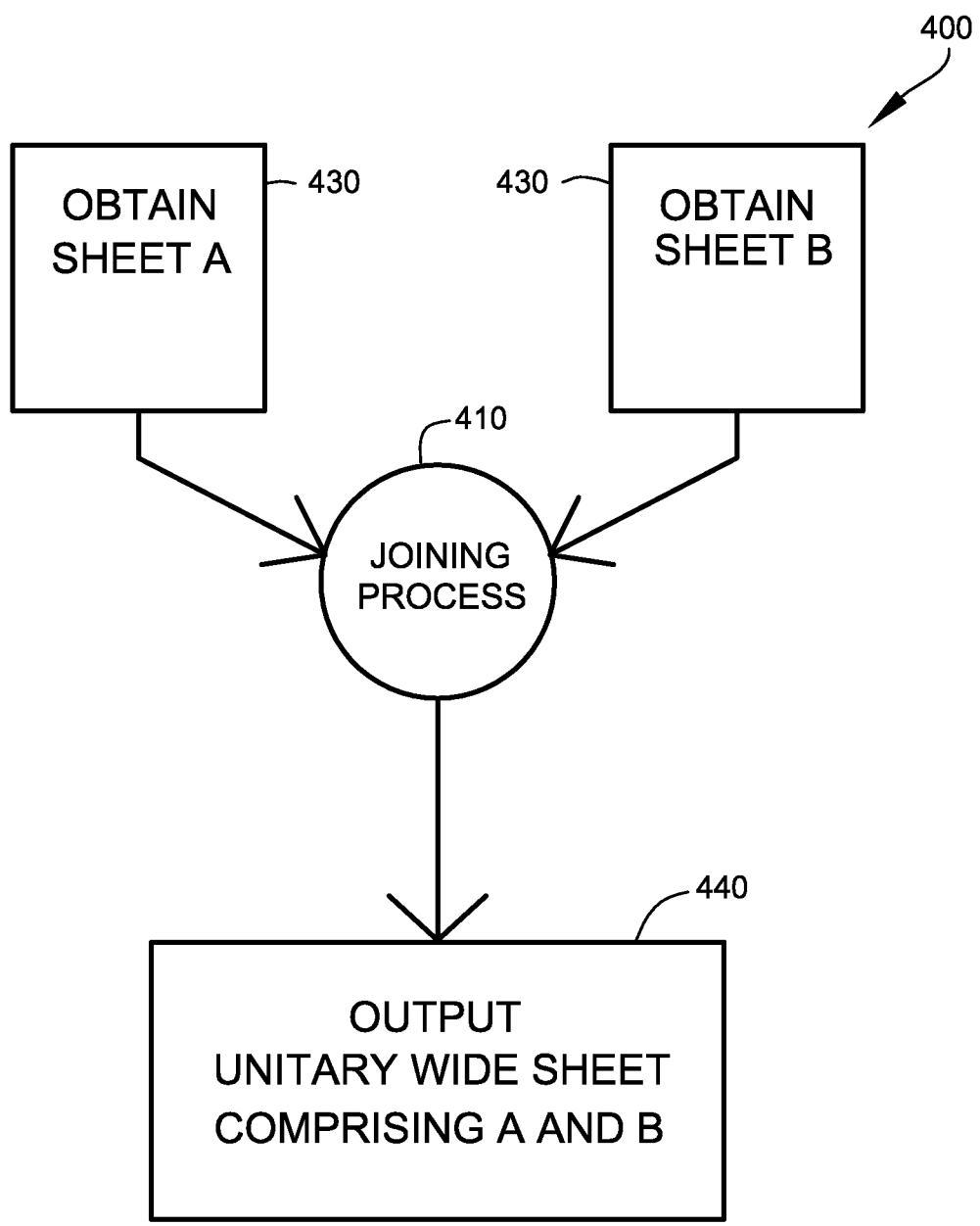
FIG. 7 shows a chart-diagram of at least one joining process, illustration at least one process flow of such at least one joining process, according to a preferred embodiment of the present invention.

FIG. 7 shows a chart-diagram view of at least one joining process 400, illustration at least one flow of joining process 400, according to a preferred embodiment of the present invention.

Joining process 400 preferably comprises the steps of: Obtaining Sheet A 420; Obtaining Sheet B 430; Join Sheets A and B 410; and Output Wide Sheet 440, as shown. Upon reading the teachings of this specification, those skilled in the art will now appreciate that, under appropriate circumstances, considering such issues as cost, future technologies, optimal processes, etc., other steps to joining processes, such as, for example, aligning steps, preparatory steps, unrolling steps, rolling steps, etc., may suffice.

In steps Obtaining Sheet A 420 and Obtaining Sheet B 430 two sheets of magnetic sheeting 115 are preferably obtained for use in joining process 400, as shown. Such two sheets are preferably joined in step Join Sheets A and B 410, as shown.

Step Join Sheets A and B 410 preferably utilizes multi-stage magnetic-sheeting joining process 200, as shown in FIG. 2, alternately preferably single-stage magnetic-sheeting joining process 100, as shown in FIG. 1, alternately preferably combinations of multi-stage magnetic-sheeting joining process 200 and/or single-stage magnetic-sheeting joining process 100, as described in relation to FIGS. 1-6.

After step Join Sheets A and B 410, step Output Wide Sheet 440 preferably comprises handling output of unitary wide-width magnetic sheeting 130, as shown. Unitary wide-width magnetic sheeting 130 is preferably rolled for later use. Upon reading the teachings of this specification, those skilled in the art will now appreciate that, under appropriate circumstances, considering such issues as cost, future technologies, etc., other output handling procedures, such as, for example, printing, cutting, engraving, etc., may suffice.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A method, relating to connecting at least one first longitudinal periphery of at least one first magnetic sheet with at least one second longitudinal periphery of at least one second magnetic sheet, comprising the steps of:
   a) placing such first longitudinal periphery in abutting-adjacent relationship with such second longitudinal periphery; and
   b) connecting such first longitudinal periphery in abutting-adjacent relationship with such second longitudinal periphery;
   c) wherein such connecting step comprises the step of unitizing such at least one first magnetic sheet and such at least one second magnetic sheet into one unitary magnetic sheet;
   d) wherein such at least one first magnetic sheet, such at least one second magnetic sheet and such unitary magnetic sheet are flexible;
   e) wherein such at least one first magnetic sheet and such at least one second magnetic sheet comprise same thickness: and
   f) wherein such unitary magnetic sheet retains the same thickness of such at least one first magnetic sheet and such at least one second magnetic sheet.

2. The method according to claim 1 further comprising the step of smoothing at least one surface of such at least one unitary magnetic sheet along at least one line defined by at least one such longitudinal periphery.

3. The method according to claim 2 wherein such smoothing step comprises smoothing sufficiently to permit printing of indicia across such at least one line with sheet printers.

4. The method according to claim 3 wherein such smoothing step further comprises the step of applying heat to such at least one line.

5. The method according to claim 4 such connecting step further comprises the step of applying heat to such first longitudinal periphery and such second longitudinal periphery.

6. The method according to claim 5 wherein the step of applying heat comprises the step of infrared-heating with at least one infrared heater.

7. The method according to claim 5 wherein the step of applying heat comprises the step of contact-heating with at least one contact heater.

8. The method according to claim 5 wherein the step of applying heat comprises the step of laser-heating with at least one laser heater.

9. The method according to claim 5 wherein the step of applying heat comprises the step of microwave-heating with at least one microwave heater.

10. A system, relating to connecting at least one first longitudinal periphery of at least one first magnetic sheet with at least one second longitudinal periphery of at least one second magnetic sheet, comprising:
    a) at least one placer structured and arranged to place such first longitudinal periphery in abutting-adjacent relationship with such second longitudinal periphery; and
    b) at least one connector structured and arranged to connect such first longitudinal periphery in abutting-adjacent relationship with such second longitudinal periphery;
    c) wherein said at least one connector comprises at least one unitizer structured and arranged to unitize such at least one first magnetic sheet and such at least one second magnetic sheet into one unitary magnetic sheet;
    d) wherein such at least one first magnetic sheet, such at least one second magnetic sheet and such unitary magnetic sheet are flexible;
    e) wherein such at least one first magnetic sheet and such at least one second magnetic sheet comprise same thickness; and
    f) wherein such unitary magnetic sheet retains the same thickness of such at least one first magnetic sheet and such at least one second magnetic sheet.

11. The system according to claim 10 further comprising at least one smoother structured and arranged to smooth at least one surface of such at least one unitary magnetic sheet along at least one line defined by at least one such longitudinal periphery.

12. The system according to claim 11 wherein such smoothing is sufficient to permit printing of indicia across such at least one line with sheet printers.

13. The system according to claim 12 wherein said at least one smoother comprises at least one heat applicator structured and arranged to apply heat to such at least one line.

14. The system according to claim 10 wherein said at least one connector further comprises at least one heat applicator structured and arranged to apply heat to such first longitudinal periphery and such second longitudinal periphery.

15. The system according to claim 14 wherein said at least one heat applicator comprises at least one infrared heater.

16. The system according to claim 14 wherein said at least one heat applicator comprises at least one contact heater.

17. The system according to claim 14 wherein said at least one heat applicator comprises at least one laser heater.

18. The system according to claim 14 wherein said at least one heat applicator comprises at least one microwave heater.

* * * * *